United States Patent
Chen et al.

(10) Patent No.: US 12,205,238 B2
(45) Date of Patent: Jan. 21, 2025

(54) AUTOMATIC DOLLY ZOOM IMAGE PROCESSING DEVICE

(71) Applicant: MediaTek Inc., Hsinchu (TW)

(72) Inventors: Chih-Wei Chen, Hsinchu (TW);
Pei-Kuei Tsung, Hsinchu (TW);
Yao-Sheng Wang, Hsinchu (TW);
Chun Chen Lin, Hsinchu (TW);
Chia-Ching Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 470 days.

(21) Appl. No.: 17/722,771

(22) Filed: Apr. 18, 2022

(65) Prior Publication Data
US 2022/0358619 A1 Nov. 10, 2022

Related U.S. Application Data

(60) Provisional application No. 63/186,198, filed on May 10, 2021.

(51) Int. Cl.
| | |
|---|---|
| G06K 9/00 | (2022.01) |
| G06T 3/04 | (2024.01) |
| G06T 3/40 | (2006.01) |
| G06T 5/50 | (2006.01) |
| G06T 5/77 | (2024.01) |
| G06T 7/11 | (2017.01) |
| G06T 7/194 | (2017.01) |

(Continued)

(52) U.S. Cl.
CPC ......... *G06T 3/40* (2013.01); *G06T 3/04* (2024.01); *G06T 5/50* (2013.01); *G06T 5/77* (2024.01); *G06T 7/11* (2017.01); *G06T 7/194* (2017.01); *G06T 7/50* (2017.01); *G06T 7/55* (2017.01); *G06T 11/00* (2013.01); *H04N 5/272* (2013.01); *G06T 2200/24* (2013.01); *G06T 2207/10004* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,089,479 B2 * | 1/2012 | Deb .................. | G06T 19/003 345/422 |
| 9,025,051 B2 * | 5/2015 | Pylvanainen ........ | H04N 5/2628 348/169 |

(Continued)

FOREIGN PATENT DOCUMENTS

| | | |
|---|---|---|
| JP | 2016213574 A | * 12/2016 |
| JP | 6552256 B2 | * 7/2019 |

*Primary Examiner* — Feng Niu
(74) *Attorney, Agent, or Firm* — Tong J. Lee

(57) ABSTRACT

A system produces a dolly zoom effect by utilizing side view information. The system first captures a main image at a main location. The main image includes at least a foreground object of a given size and a background. The system calculates one or more side view locations based on a zoom-in factor to be applied to the background and an estimated size of the foreground object. The system then guides a user to capture one or more side view images at the one or more side view locations. The foreground object of the given size is superimposed onto a zoomed-in background. Then the side view information is used by the system to perform image inpainting.

20 Claims, 10 Drawing Sheets

(51) Int. Cl.
  *G06T 7/50* (2017.01)
  *G06T 7/55* (2017.01)
  *G06T 11/00* (2006.01)
  *H04N 5/272* (2006.01)

(56) References Cited

U.S. PATENT DOCUMENTS

| | | | |
|---|---|---|---|
| 9,214,040 | B2* | 12/2015 | Smolic ................ H04N 19/597 |
| 9,665,939 | B2* | 5/2017 | Nakayama ................ G06T 5/50 |
| 9,760,976 | B2* | 9/2017 | Kameyama ............ G06T 11/60 |
| 10,304,161 | B2* | 5/2019 | Nakayama ............... G06T 7/74 |
| 10,412,374 | B2* | 9/2019 | Kimura ................. H04N 13/20 |
| 10,872,420 | B2* | 12/2020 | Shukla ..................... G06N 3/08 |
| 11,418,704 | B2* | 8/2022 | Luo ......................... H04N 23/69 |
| 11,423,510 | B2 | 8/2022 | Ranade |
| 2004/0008773 | A1* | 1/2004 | Itokawa ........... G08B 13/19689 |
| | | | 348/E7.086 |
| 2009/0256837 | A1* | 10/2009 | Deb ...................... G06T 19/003 |
| | | | 345/419 |
| 2011/0193993 | A1* | 8/2011 | Yeom .................... H04N 23/63 |
| | | | 348/E5.022 |
| 2011/0261050 | A1* | 10/2011 | Smolic ................... G06T 15/20 |
| | | | 345/419 |
| 2014/0240553 | A1 | 8/2014 | Pylvanainen |
| 2015/0286899 | A1* | 10/2015 | Nakayama ................ G06T 3/18 |
| | | | 382/224 |
| 2016/0225167 | A1* | 8/2016 | Kameyama .......... H04N 23/661 |
| 2017/0150130 | A1* | 5/2017 | Kimura .................. H04N 13/20 |
| 2017/0228853 | A1* | 8/2017 | Nakayama ............... G06T 7/74 |
| 2019/0080457 | A1* | 3/2019 | Shukla .................. G06F 18/253 |
| 2021/0037179 | A1 | 2/2021 | Luo |
| 2021/0125307 | A1* | 4/2021 | Ranade ..................... G06T 7/55 |

* cited by examiner

AUTOMATIC DOLLY ZOOM IMAGE PROCESSING DEVICE

CROSS-REFERENCE TO RELATED APPLICATIONS

This application claims the benefit of U.S. Provisional Application No. 63/186,198 filed on May 10, 2021, the entirety of which is incorporated by reference herein.

TECHNICAL FIELD

Embodiments of the invention relate to an image processing device that produces an automatic dolly zoom effect.

BACKGROUND

Dolly zoom is a technique in photography and filming for producing an effect of perspective distortion. During a dolly zoom process, the camera dollies (i.e., moves) forward or backward while the photographed subjects stay in place. As the camera dollies to change the shooting position, the zoom lens of the camera changes its field of view (FOV) to keep a foreground object the same size in the image sequence. The FOV changes when the camera zooms in or out. During the zoom process, the background appears to change size relative to the foreground object.

A camera can produce the dolly zoom effect by "dolly-in and zoom-out" or "dolly-out and zoom-in." When a camera dollies in and zooms out, the size of the subject remains unchanged in the captured image and the background is zoomed out. When a camera dollies out and zooms in, the size of the subject remains unchanged in the captured image and the background is zoomed in. Normally, producing the dolly zoom effect requires sophisticated equipment and expertise in photography. It is a challenge for an amateur to coordinate the dolly and zoom operations of a camera.

Digital image processing techniques have been developed to simulate the dolly zoom effect. An objective of these techniques is to make the dolly zoom effect easy to create. However, some of these techniques extrapolate pixel values from a captured image and produce a blurry or unreal image. Thus, there is a need for improving image processing techniques in the creation of the dolly zoom effect.

SUMMARY

In one embodiment, a method is provided for producing a dolly zoom effect. The method comprises the step of capturing a main image at a main location, the main image including at least a foreground object of a given size and a background. The method further comprises the steps of calculating one or more side view locations based on a zoom-in factor to be applied to the background and an estimated size of the foreground object; guide a user to capture one or more side view images at the one or more side view locations; superimposing the foreground object of the given size onto a zoomed-in background; and performing image inpainting using the side view information.

In another embodiment, a system is provided for producing a dolly zoom effect. The system comprises a camera to capture a main image at a main location, the main image including at least a foreground object of a given size and a background. The system further comprises processing hardware and a memory to store instructions, which, when executed by the processing hardware, cause the processing hardware to calculate one or more side view locations based on a zoom-in factor to be applied to the background and an estimated size of the foreground object; guide a user to use the camera to capture one or more side view images at the one or more side view locations; superimpose the foreground object of the given size onto a zoomed-in background; and perform image inpainting using the side view information.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
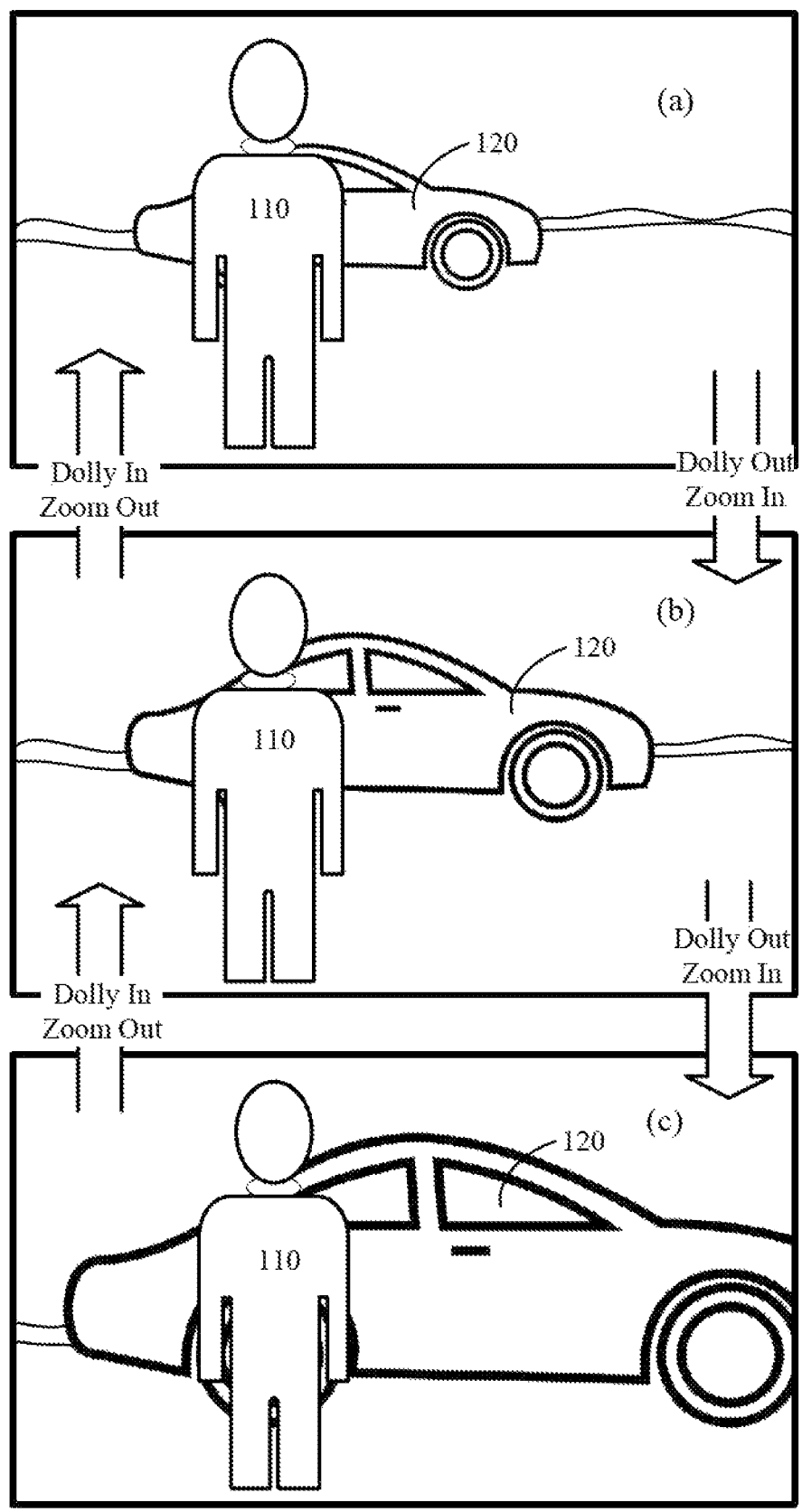
FIG. 1 illustrates an example of a dolly zoom effect according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method, device, system, and computer product that can automatically produce a dolly zoom effect in an image captured by a camera, without the user doing dolly in/out or manual zooming. The captured image includes a foreground object and a background. The dolly zoom effect keeps the size of the foreground object while the background zoom in or out.

For the dolly-out zoom-in effect, a user first takes a main photo using an image capturing device with a focal length (F) at an original location. The user identifies a target in the foreground of the main photo, and identifies a background zoom-in factor. The device then guides the user to take side view photos at locations shifted from the original location. The side view photos may be taken with the same focal length (F). The device performs image segmentation to extract the target from the main photo, and superimposes the extracted target (which stays at the same size) onto the zoomed-in background to produce a warped image. Based on the information provided by the main photo and the side view photos, the device can process the warped image into a processed photo, which includes the target (of the same size as in the main photo) and the background (adjusted by a zoom-in factor).

In one embodiment, the device generates the processed photo by performing inpainting operations in the background areas that are blocked by the target in the main photo and are exposed after the background zoom-in. These background areas are also referred to as "holes." The inpainting operation utilizes the information in the main photo and the side view photos to fill in the holes. Thus, the holes' pixel values are generated from real image sources, unlike conventional methods that extrapolate the pixel values from nearby points. As such, the device-guided side view mechanism can generate realistic images that have the dolly-out zoom-in effect.

For the dolly-in zoom-out effect, a user first takes a main photo using an image capturing device with a first focal length (Fa) at an original location. The user identifies a target in the foreground of the main photo, and identifies a background zoom-out factor. The device automatically reduces the focal length to Fb, where Fa>Fb, and takes a second photo at the same original location. The lower focal length increases the angle of view in the zoomed-out background (i.e., more background is captured). The device performs image segmentation to segment the target from the main photo, and superimposes the segmented target (which stays at the same size) onto the zoomed-out background to produce a processed photo that has the dolly-in zoom-out effect.

FIG. 1 illustrates an example of a dolly zoom effect in an image sequence. The sequence of images (a), (b), (c) illustrates the effect of dolly-out and zoom-in; that is, moving the camera away from a target object 110 while zooming in on the target object 110. When the camera dollies out and zooms in, the focal length of the camera becomes longer and less of the background can be seen. By contrast, the sequence of images (c), (b), (a) illustrates the effect of dolly-in and zoom-out; that is, moving the camera towards the target object 110 while zooming out on the target object 110. When the camera dollies in and zooms out, the focal length of the camera becomes shorter and more of the background can be seen. The target object 110 maintains the same size in all three images in contrast to a background object 120 (e.g., a car), which becomes larger when the camera zooms in (from (a) to (c)) and becomes smaller when the camera zooms out (from (c) to (a)).

Figure 2:
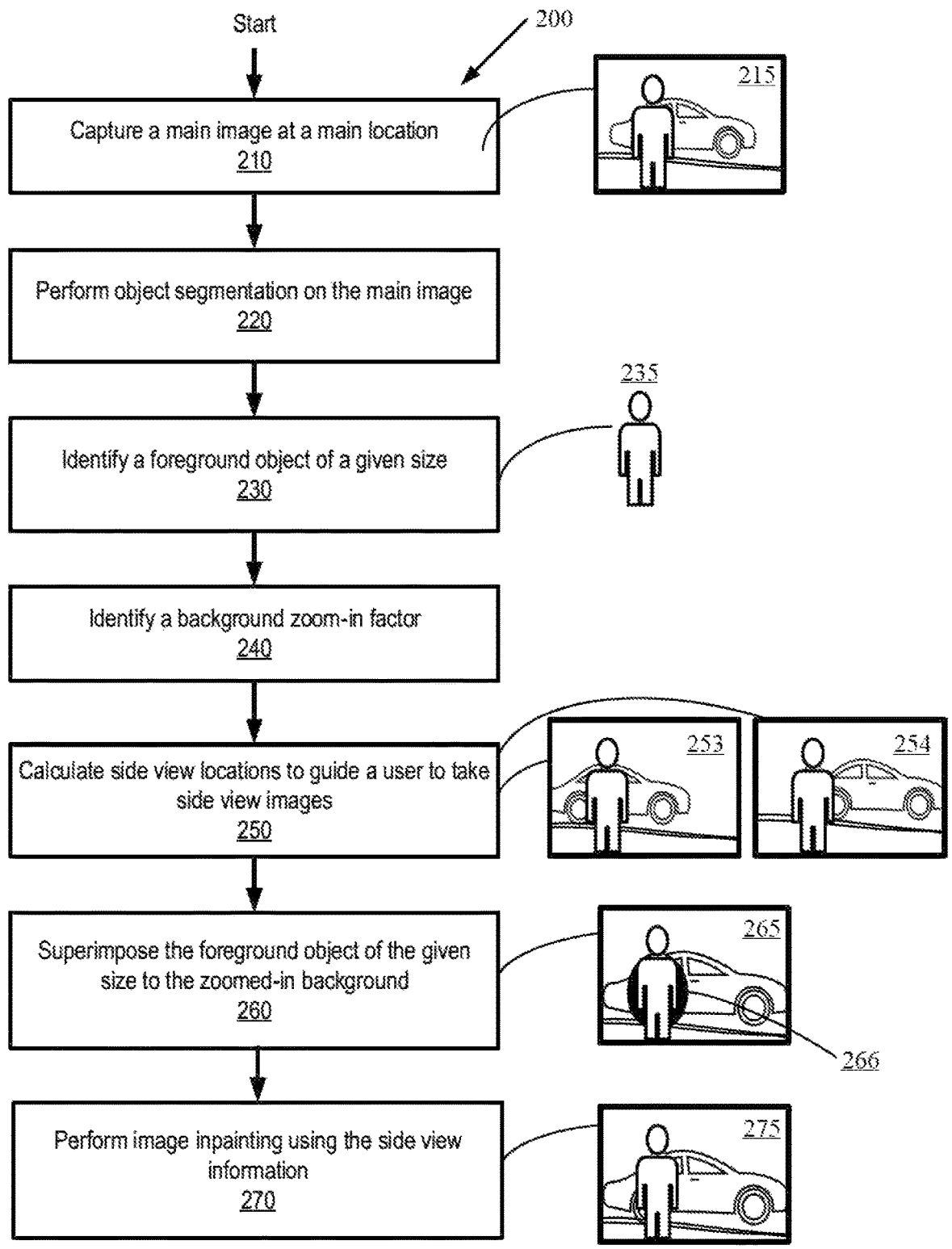
FIG. 2 illustrates a method for producing a dolly-out zoom-in effect according to one embodiment.

FIG. 2 illustrates a method 200 for producing a dolly-out zoom-in effect according to one embodiment. Method 200 may be performed by a device, such as an image capturing and processing device. Method 200 starts when the device at step 210 takes a main image (e.g., a main image 215) at a main location. At step 220, the device performs object segmentation on the main image 215. At step 230, the device identifies a foreground object (e.g., a person 235) of a given size in the segmented image. In one embodiment, a user may select one of the segmented objects to be the foreground object. The user's selection may be made via a user interface; e.g., a touch panel on the device. At step 240, the device identifies a background zoom-in factor. In one embodiment, a user may input the zoom-in factor via a user interface. At step 250, the device calculates side view locations to guide a user to take side view images (e.g., side view images 253 and 254). At step 260, the device superimposes the foreground object (e.g., the person 235) of the given size to the zoomed-in background, which is the main image's background magnified by the zoom-in factor. As shown in an image 265, the zoom-in effect magnifies an area 266 of the main image blocked by the person 235. The area 266 is a gap or hole behind the person 235. At step 270, the device performs image inpainting to fill the area 266, using the information from the side view images 253 and 254. The result is a processed image 275 which includes the foreground object of the given size (i.e., the same size as in the main image 215) and the zoomed-in background.

Figure 3:
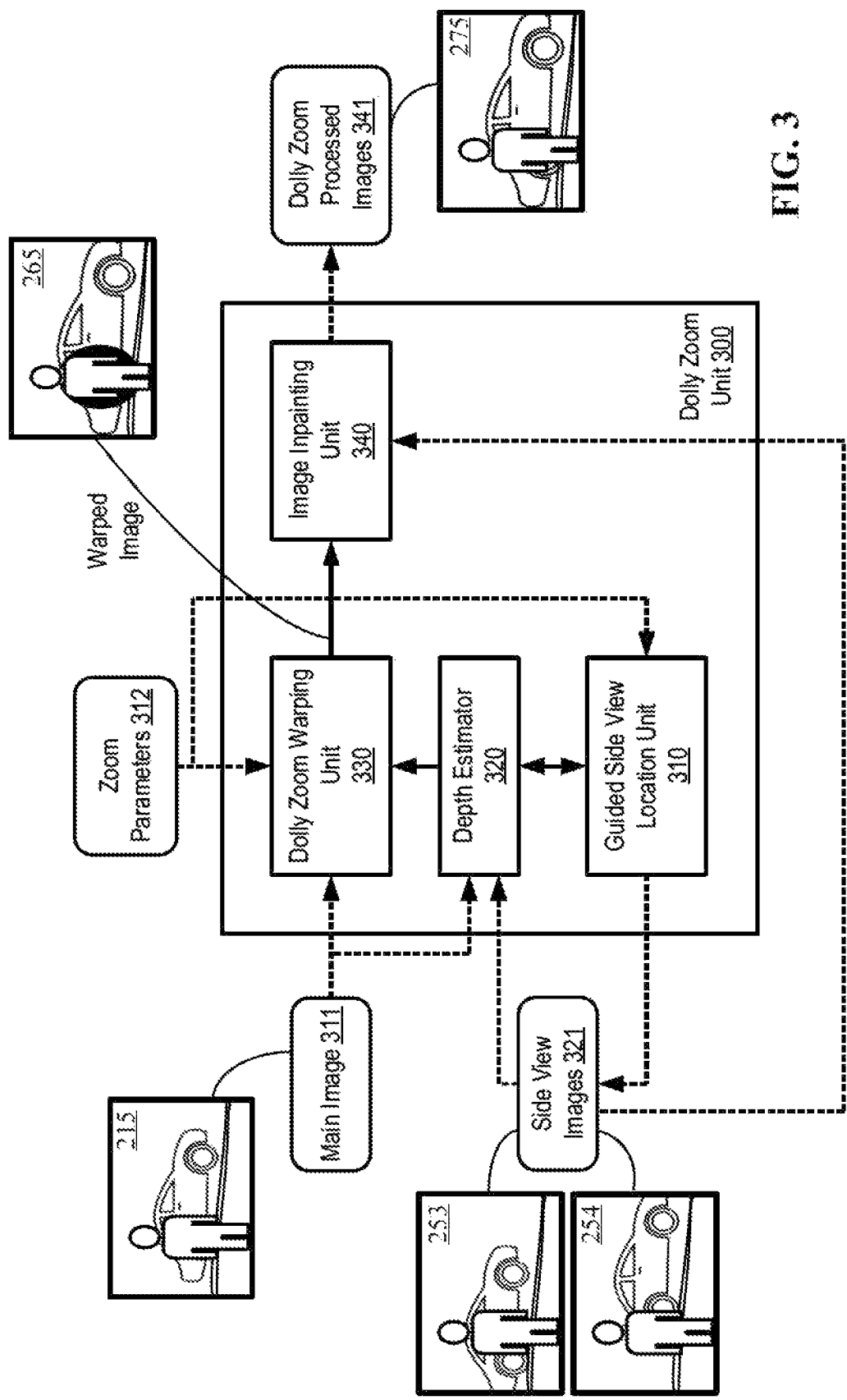
FIG. 3 is a block diagram illustrating a dolly-zoom unit according to one embodiment.

FIG. 3 is a block diagram illustrating a dolly-zoom unit 300 ("unit 300") according to one embodiment. The unit 300 includes hardware and software executed by the hardware. Non-limiting examples of the hardware may include a digital signal processor, a central processing unit (CPU), a graphics processing unit (GPU), a neural network processing unit (NPU), etc. The unit 300 may be coupled to a camera for capturing images and a display for displaying the captured images and processed images. In one embodiment, the unit 300 may be part of a device that performs method 200 in FIG. 2. In the example of FIG. 3, the dotted arrows indicate the flow of input/output data, and the solid arrows indicate the flow of the operation sequence.

In one embodiment, the unit 300 includes a guided side view location unit 310, a depth estimator 320, a dolly zoom warping unit 330, and an image inpainting unit 340. Referring also to the images in FIG. 2, a main image 311 (e.g., the main image 215) is taken. The depth estimator 210 estimates a depth map of the main image 311 to enable the identification of a foreground object. In one embodiment, the depth map may be generated using a trained neural network. The depth map may also be used to estimate the size of and the distance to the foreground object. Based on the information gathered by the depth estimator 210 from the main image 311 and zoom parameters 312 (e.g., the background zoom-in factor in step 240 of FIG. 2), the guided side view location unit 310 generates a side view guide. The side view guide can be used by the device or a user of the device to identify side view locations and to take side view images 321 (e.g., the side view 253 and 254) from the side view locations. The depth estimator 210 further estimates a depth map for each side view image 321.

According to the zoom parameters 312, the dolly zoom warping unit 330 applies a zoom-in factor to the background of the main image 311, and superimposes the foreground object with unchanged size onto the zoomed-in background. The result is a warped image such as the image 265. The image inpainting unit 340 applies the information in the side view images 321 to the warped image to fill the hole in the warped image. The output of the image inpainting unit 340 is a dolly zoom processed image 341 (e.g., the image 275).

Figure 4:
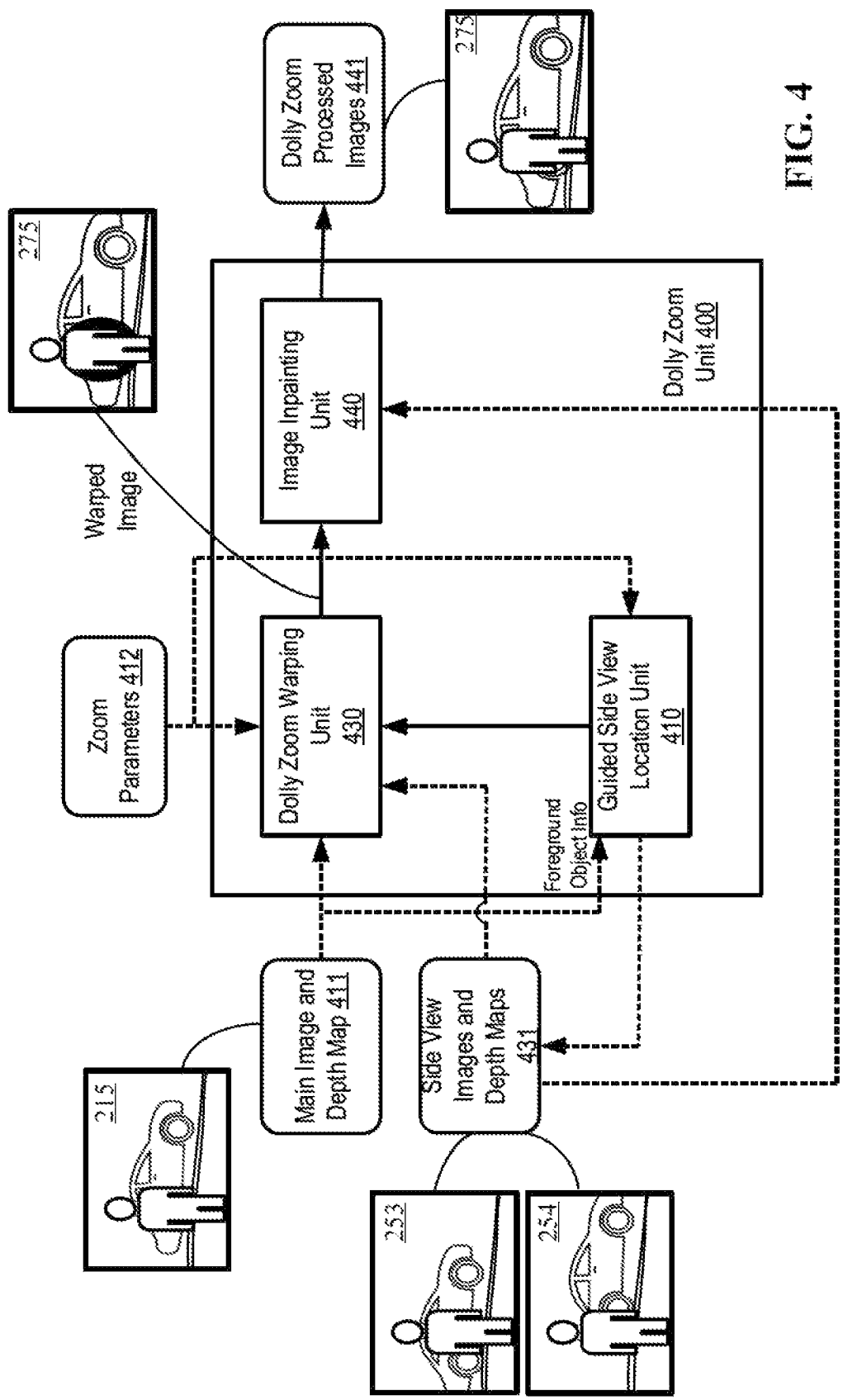
FIG. 4 is a block diagram illustrating a dolly-zoom unit according to another embodiment.

FIG. 4 is a block diagram illustrating a dolly-zoom unit 400 ("unit 400") according to another embodiment. The unit 400 includes a guided side view location unit 410, a dolly zoom warping unit 430, and an image inpainting unit 440.

Instead of generating the depth maps by a depth estimator, the unit 400 receives an image together with its depth map from a camera such as a depth-sensing camera. The device (in which the unit 400 is located) may determine, from a main image and its depth map 411, information of the foreground object such as the size of and the distance to the foreground object. Based on the depth information of the foreground object and zoom parameters 412 (e.g., the background zoom-in factor in step 240 of FIG. 2), the guided side view location unit 410 generates a side view guide. The side view guide can be used by the device or a user of the device to identify side view locations and to take side view images (e.g., the side view 253 and 254) and their respective depth maps 421 from the side view locations.

The dolly zoom warping unit 430 and the image inpainting unit 440 operate in the same way as the dolly zoom warping unit 330 and the image inpainting unit 340 in FIG. 3, respectively. The output of the image inpainting unit 440 is a dolly zoom processed image 441 (e.g., the image 275).

Figure 5:
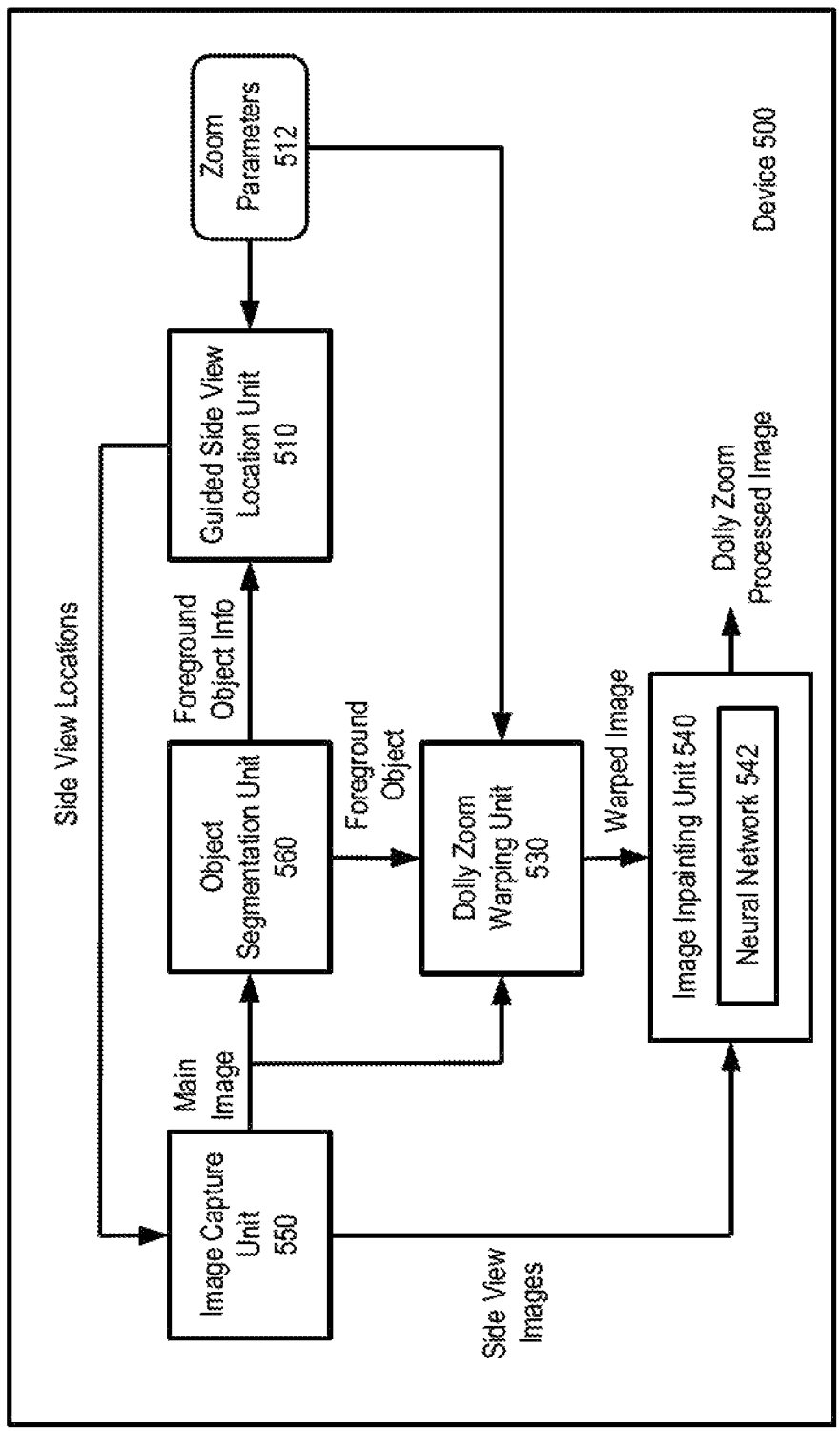
FIG. 5 is a diagram of a device operative to produce an automatic dolly zoom effect according to one embodiment.

FIG. 5 is a diagram of a device 500 operative to produce an automatic dolly zoom effect according to one embodiment. In one embodiment, the device 500 may perform method 200 of FIG. 2. The device 500 may include the dolly zoom unit 300 (FIG. 3) or the dolly zoom unit 400 (FIG. 4). In one embodiment, the device 500 includes an image capture unit 550, an object segmentation unit 560, a guided side view location unit 510, a dolly zoom warping unit 530, and an image inpainting unit 540. Each of the units may be implemented by dedicated circuits or general-purpose circuits that operate under the control of one or more processors and instructions stored in a memory. Thus, in one embodiment, each of the units may also be referred to as a circuit. The device 500 may also include a display for displaying the captured images and/or the processed images. The device 500 may also include a user interface for interacting with the user regarding the identification and selection of a foreground object in the main image. As an example, the UI may include a touch panel that overlays a display to receive user input. Other types of UI for receiving user input may also be included.

Initially, the image capture unit 550 captures a main image. The object segmentation unit 560 is operative to locate objects and object boundaries in the main image. In one embodiment, the object segmentation unit 560 may operate according to a neural network that has been trained on a large set of training images for object segmentation. The device 500 may automatically, or aided by the user, identify a foreground object from the segmentation results. The device 500 then generates information about the foreground object such as the size and depth of the foreground object.

The guided side view location unit 510 receives the foreground object information and zoom parameters 512, and outputs side view locations for the image capture unit 550 to capture side view images. The dolly zoom warping unit 530 receives the zoom parameters 512 and the main image with the foreground object identified therein, and outputs a warped image. The image inpainting unit 540 receives the warped image and uses the side view images to fill the hole (e.g., the area 266 in FIG. 2) in the warped image.

In one embodiment, the image inpainting unit 540 uses a neural network 542 to perform image inpainting and outputs a dolly zoom processed image. The neural network 542 has been trained on a large set of training images for image inpainting. The inpainting operations fill the hole in the warped image with the matching image pixels in the side view images. Non-limiting examples of the neural network model 542 include a convolutional neural network (CNN), a recurrent neural network (RNN), an attention-based neural network, and their variants. The neural network model 542 may be stored in a memory of the device 500.

Figure 6:
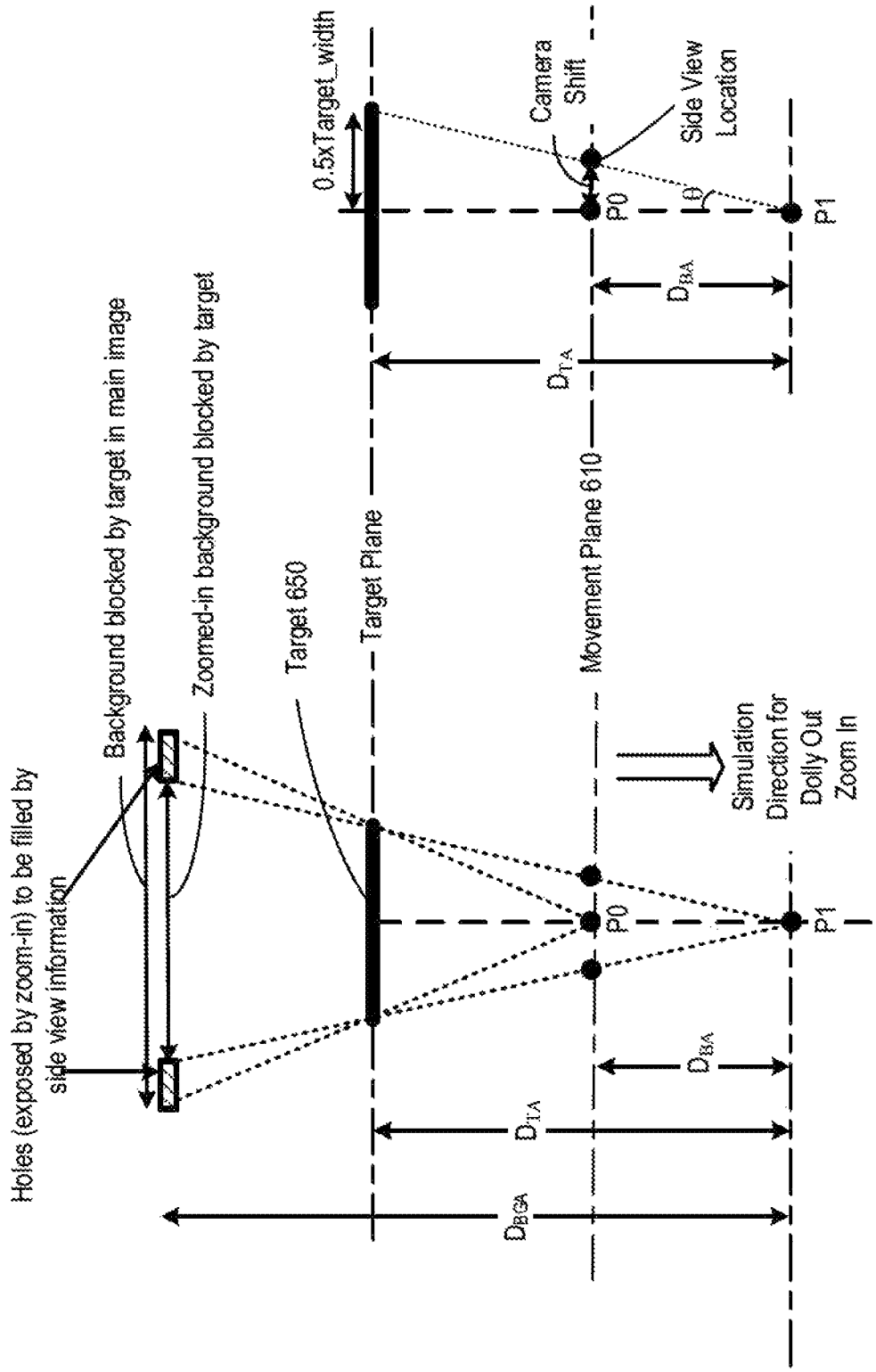
FIG. 6 illustrates a geometric relationship among camera positions, a foreground object, and background according to one embodiment.

FIG. 6 illustrates a geometric relationship between camera positions, a foreground object (e.g., a target 650), and a background according to one embodiment. For example, the camera positions P0 and P1 may correspond to the images (a) and (b) in FIG. 1, respectively. Referring also to FIGS. 2-5, the dolly-out zoom-in effect produced by method 200 simulates the dolly-out of a camera from P0 to P1 while zooming-in on the target. The camera takes a main image at P0, and moves sideways on the movement plane 610 to take side view images. The distances from P1 to the background, the target 650, and P1 are $D_{BGA}$, $D_{TA}$, and $D_{BA}$, respectively. $D_{TA}$ is also referred to as the foreground depth and $D_{BA}$ is also referred to as the simulated dolly-out distance. FIG. 6 also shows the background area blocked by the target 650 in the main image, and the zoomed-in background blocked by target 650. The difference between the two blocked areas is the holes that are exposed by zoomed-in background and are to be filled by the side view information.

The device 500 enlarges the background and maintains the size of the target to produce the dolly-out zoom-in effect. In one embodiment, the device 500 calculates the side view locations using the geometric relationship: (0.5×Target_width)/Camera_shift=$D_{TA}/D_{BA}$, where $D_{TA}/D_{BA}$ is the zoom-in factor and represents the target simulation space. Therefore, Camera_shift=0.5×Target_width×$D_{TA}/D_{BA}$, where Camera_shift indicates the distance between the main location (where the main image is taken) and a side view location.

The width of the target, i.e., Target_width, can be obtained from depth, angle θ to one side of the target, and a pixels ratio. In one embodiment, Target_width=($D_{TA}$×tan θ)×(object pixel/image pixel width), where "object pixel" is the number of pixels in the foreground object of the main image, and "image pixel width" is the number of pixels in the main image width. For example, if Target_width=100 cm and $D_{TA}/D_{BA}$=½, Camera_shift=0.5×100 cm×½=25 cm.

Figure 7:
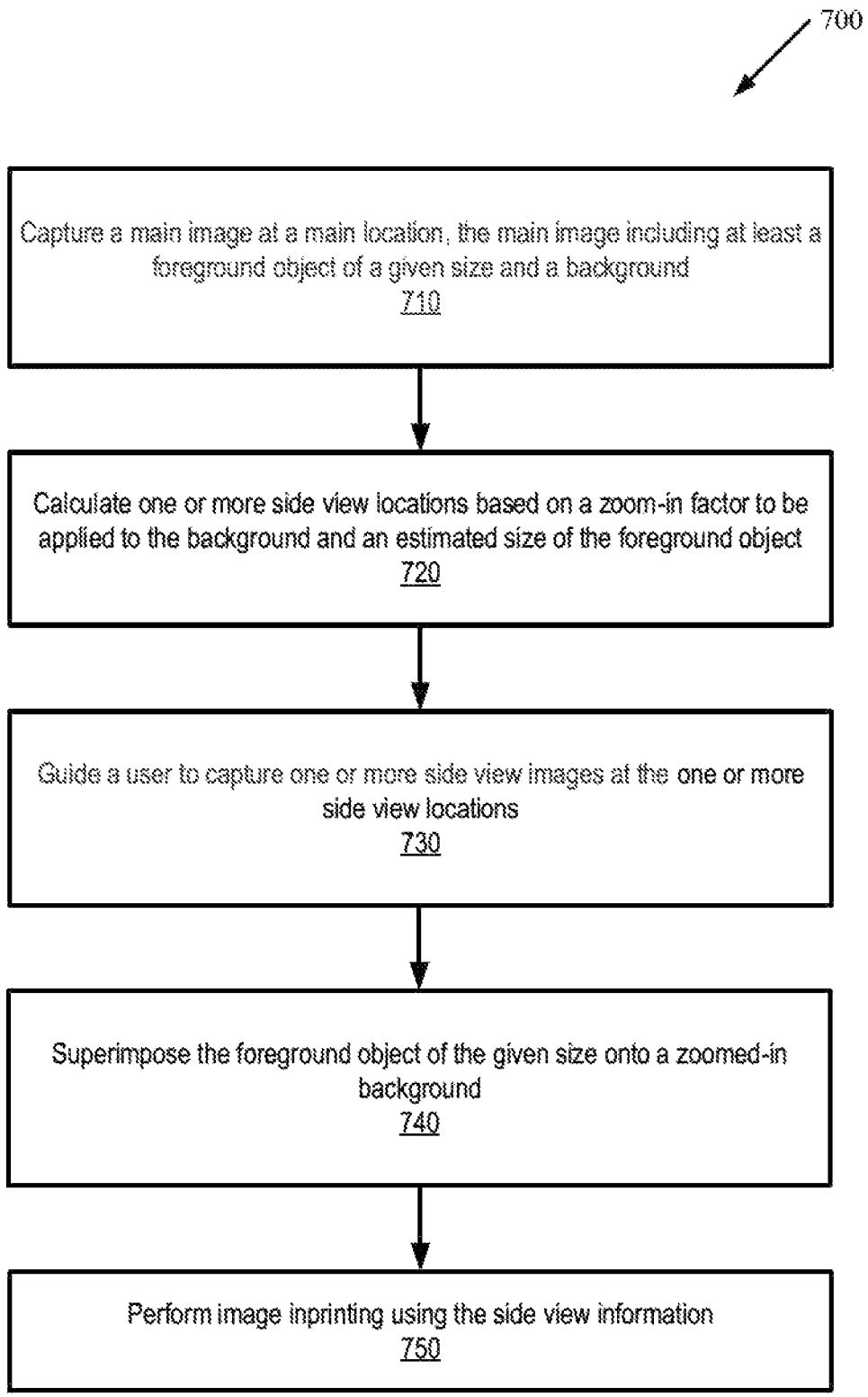
FIG. 7 is a flow diagram illustrating a dolly-out zoom-in method according to one embodiment.

FIG. 7 is a flow diagram illustrating a dolly zoom method 700 according to one embodiment. More specifically, method 700 is a dolly-out zoom-in method by digital simulation. Method 700 may be performed by the device 500 in FIG. 5 or another electronic device having image capturing and processing capabilities. Method 700 starts at step 710 when the device captures a main image at a main location, the main image including at least a foreground object of a given size and a background. The device at step 720 calculates one or more side view locations based on a zoom-in factor to be applied to the background and an estimated size of the foreground object. The device at step 730 guides a user to capture one or more side view images at the one or more side view locations. The device at step 740 superimposes the foreground object of the given size onto the zoom-in background. The device at step 750 performs image inpainting using the side view information.

In one embodiment, the distance between the main location and a side view location may be calculated based on the zoom-in factor and an estimated width of the foreground object. The device may display, on a user interface, an indication of the distance to guide the user to the side view location, and may also indicate that the user has reached the side view location. A first side view image may be captured at a first side view location having the calculated distance to the right of the main location, and a second side view image may be captured at a second side view location having the calculated distance to the left of the main location. The main image and the one or more side view images may be captured with the same focal length.

In one embodiment, the device may use a trained neural network to generate a respective depth map for each of the main image and the one or more side view images. In another embodiment, the device may obtain (e.g., from a depth-sensing camera of the device) a respective depth map when capturing each of the main image and the one or more side view images. Then the foreground object and the background may be identified based on depth maps.

In one embodiment, the device may perform the image inpainting to fill in background areas adjacent to the foreground object with information obtained from the one or more side view images. The image inpainting may be performed using a trained neural network. In one embodiment, steps 720-750 may be repeated with progressively increasing zoom-in factors to produce an image sequence with the dolly-out zoom-in effect.

Figure 8:
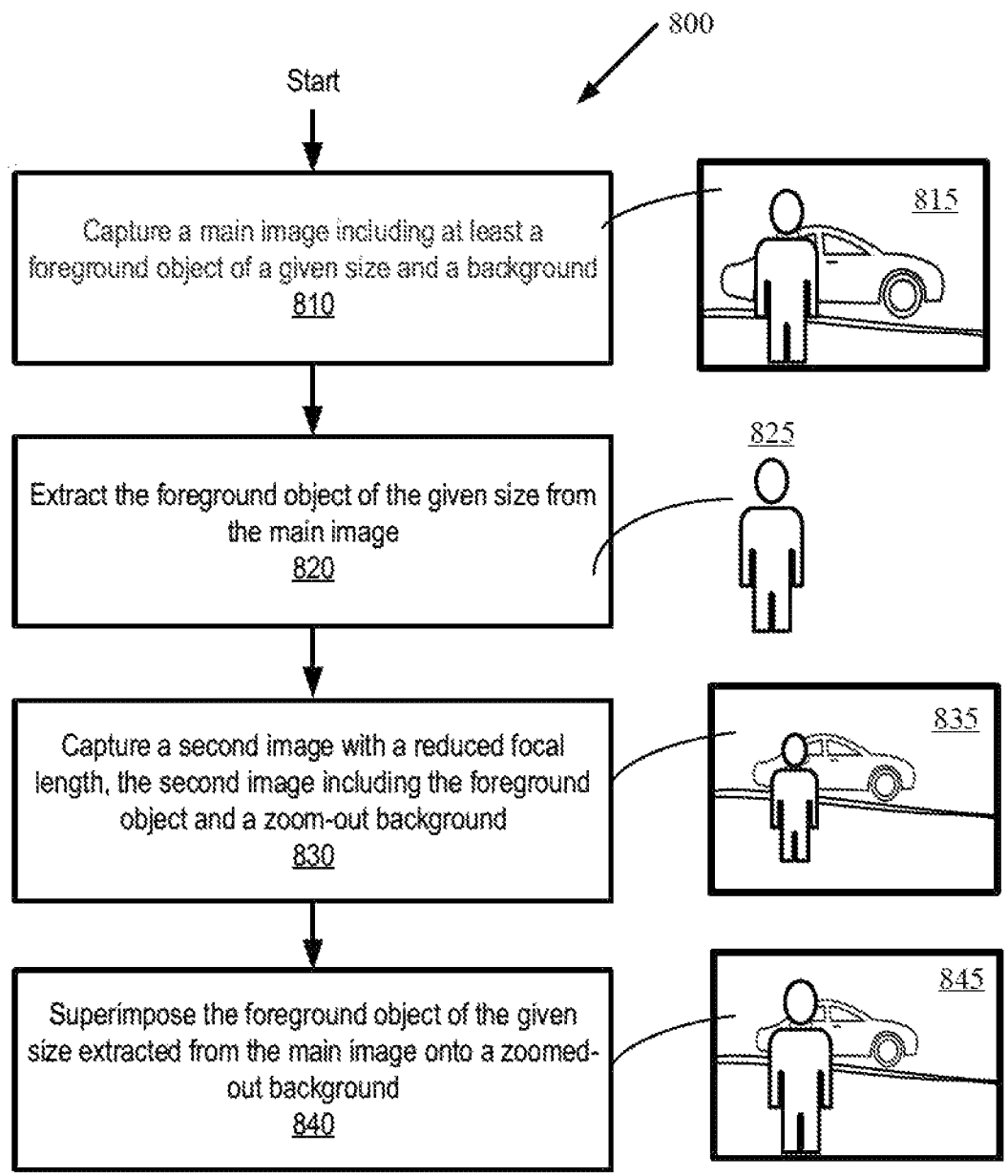
FIG. 8 is a flow diagram illustrating a dolly-in zoom-out method according to one embodiment.

Having described the dolly-out zoom-in effect, the following disclosure describes the creation of dolly-in zoom-out effect by digital simulation. FIG. 8 is a flow diagram illustrating a dolly-in zoom-out method 800 according to one embodiment. Method 800 may be performed by a device or system, such as a system 1000 in FIG. 10 or another electronic device having image capturing and processing capabilities. Method 800 starts at step 810 when the system captures a main image (e.g., a main image 815) including at least a foreground object of a given size and a background. The system at step 820 extracts the foreground object (e.g., a target 825) of the given size from the main image. The extraction may be aided by object segmentation and/or user input. The system at step 830 captures a second image (e.g., an image 835) with a reduced focal length. The second image includes the foreground object and a zoom-out background, where the zooming-out increases the field of view coverage of the background. The reduced focal length corresponds to a zoom-out factor, which may be provided by the user or set by the system. The system may calculate the reduced focal length automatically and may adjust the focal length automatically. The system at step 840 superimposes the foreground object of the given size extracted from the main image onto a zoomed-out background. The system then outputs the superimposed image (e.g., an image 845). In one embodiment, steps 830 and 840 may be repeated with progressively increasing zoom-out factors to produce an image sequence with the dolly-in zoom-out effect.

Figure 9:
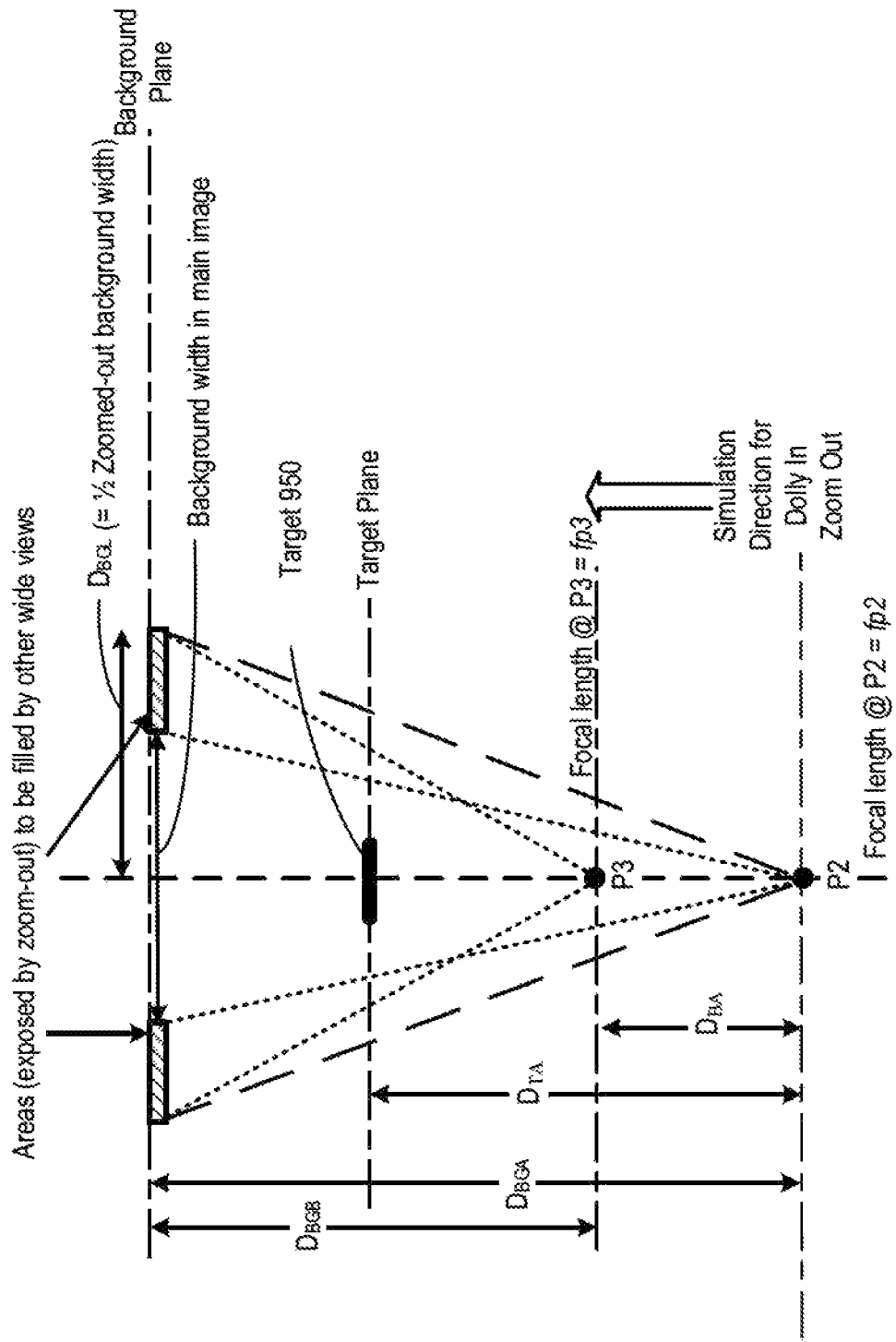
FIG. 9 illustrates a geometric relationship among camera positions, a foreground object, and background according to another embodiment.

FIG. 9 illustrates a geometric relationship among camera positions, a foreground object (e.g., a target 950), and a background according to another embodiment. For example, the camera positions P2 and P3 may correspond to the images (c) and (b) in FIG. 1, respectively. The conventional method for creating the dolly-in zoom-out effect is to manually move the camera from P2 (with focal length fp2) to P3 (with focal length fp3), where fp2>fp3, and the value of fp3 is chosen to maintain the target size in the images. To simulate the dolly-in zoom-out effect without moving the camera, the camera takes a main image with focal length fp2 at P2, and, at the same location P2, reduces the focal length to fp2' to take an image with a wide-angle view. The steps for producing the simulated dolly-in zoom-out effect are described in method 800 of FIG. 8.

In one embodiment, the focal length fp2' can be calculated automatically by the system performing method 800 of FIG. 8. FIG. 9 shows that the distances from P2 to the background, the target 950, and P3 are $D_{BGA}$, $D_{TA}$, and $D_{BA}$, respectively. The distance from P3 to the background is $D_{BGB}$. These distances can be measured or estimated by the system using a depth estimator or a depth sensor. FIG. 9 also shows the background width in the main image, and the zoomed-out background width (where half of the zoomed-out background width is denoted by $D_{BGL}$). The difference between the two background widths is the areas near the image edge, where the areas are exposed by background zoom-out and are to be filled by the wide-angle view information. The formula for calculating fp2' is as follows.

$$fp2'=fp3 \times D_{BGA}/D_{BGB}, \text{ where } fp3=fp2 \times (D_{TA}-D_{BA})/D_{TA}.$$

For example, when fp3=17 mm², $D_{BGA}$=300 cm, and $D_{BGB}$=200 cm, fp2'=17 mm²×300 cm/200 cm=25.5 mm².

The derivation of the above formula is as follows:
Since $D_{BGB}$/fp3=$D_{BGL}$/0.5×Sensor_size, and fp2'/0.5×Sensor_size=$D_{BGA}$/$D_{BGL}$, it follows that $D_{BGL}$=$D_{BGB}$×0.5×Sensor_size/fp3, and fp2'=$D_{BGA}$×0.5×Sensor_size/$D_{BGL}$. Thus, fp2'=fp3×$D_{BGA}$/$D_{BGB}$.

Figure 10:
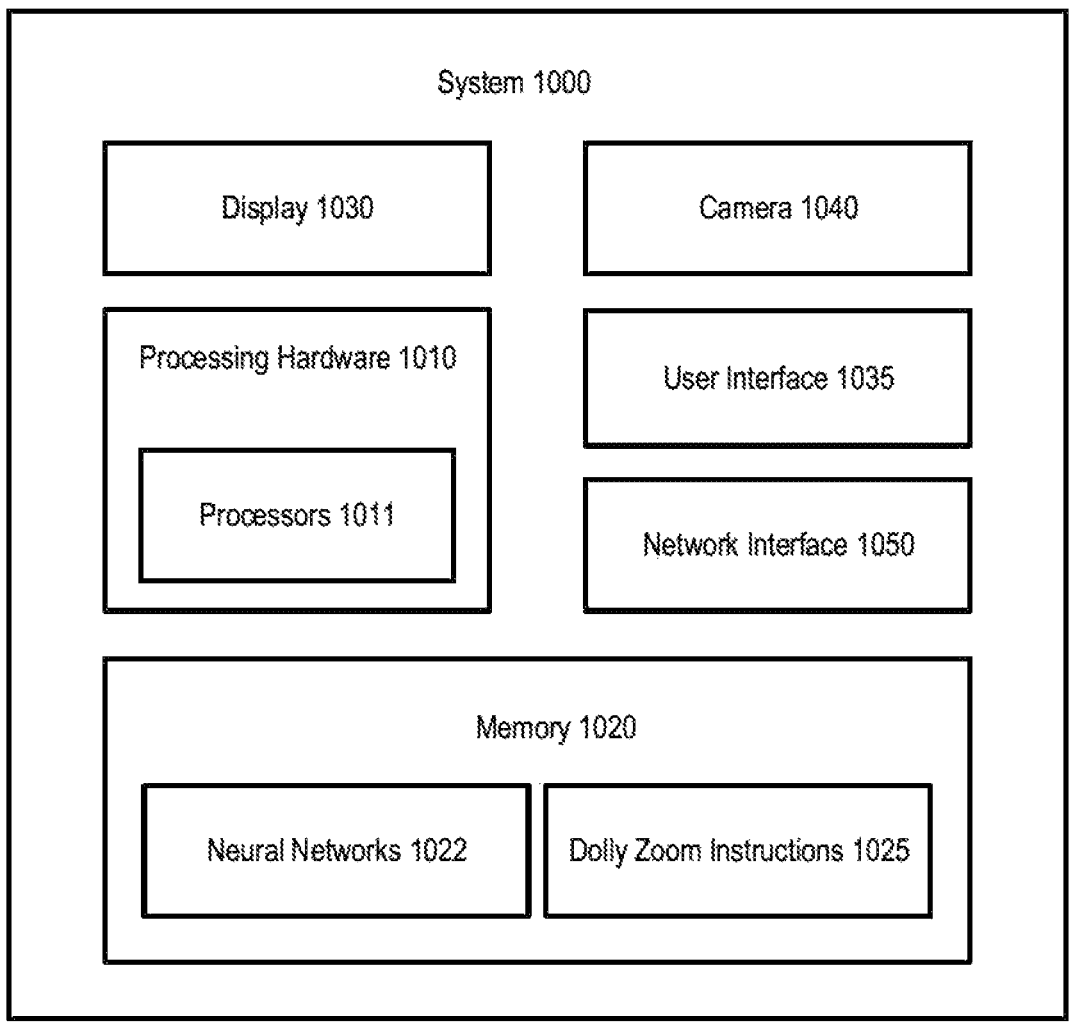
FIG. 10 is a block diagram illustrating a system operative to perform automatic dolly zoom image processing according to one embodiment.

FIG. 10 is a block diagram illustrating a system 1000 operative to perform automatic dolly zoom image processing according to one embodiment. The system 1000 includes hardware and software for executing the methods described in connection with FIGS. 2, 7, and 8. The system 1000 includes processing hardware 1010 which further includes one or more processors 1011 such as central processing units (CPUs), graphics processing units (GPUs), digital processing units (DSPs), neural processing units (NPUs), field-programmable gate arrays (FPGAs), application-specific integrated circuits (ASICs), and other general-purpose processors and/or special-purpose processors. The NPU may perform tensor operations; e.g., object segmentation, depth estimation, and/or image inpainting according to trained neural networks 1022 stored in a memory 1020. Examples of the tensor operations include, but are not limited to: convolution, deconvolution, fully-connected operations, normalization, activation, pooling, resizing, element-wise arithmetic, concatenation, slicing, etc.

The memory 1020 is coupled to the processing hardware 1010. The memory 1020 may include dynamic random access memory (DRAM), SRAM, flash memory, and other non-transitory machine-readable storage media; e.g., volatile or non-volatile memory devices. The memory 1020 may further include storage devices, for example, any type of solid-state or magnetic storage device. In one embodiment, the memory 1020 may store instructions which, when executed by the processing hardware 1010, cause the processing hardware 1010 to perform the aforementioned automatic dolly zoom operations, such as methods 200, 700, and 800 in FIGS. 2, 7, and 8, respectively. In one embodiment, the memory 1020 may store dolly zoom instructions 1025 for the processing hardware 1010 to execute the operations of one or more of object segmentation, depth estimation, side view location calculation, image inpainting, focal length calculation and adjustment, etc.

The system 1000 also includes a display 1030 and a camera 1040 (also referred to as an image capture unit). The system 1000 may also include a user interface 1035 to interact with the users. In some embodiments, the system 1000 may also include a network interface 1050 to connect to a wired and/or wireless network for transmitting and/or receiving signals such as image data. It is understood the embodiment of FIG. 10 is simplified for illustration purposes. Additional hardware components may be included.

It should be understood that the system 1000 can perform operations different than those discussed with reference to the flow diagrams of FIGS. 2, 7, and 8, and the operations of the flow diagrams of Figures FIGS. 2, 7, and 8 can be performed by embodiments of the invention other than the system 1000.

Various functional components, blocks, or units have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the flow diagrams of FIGS. 2, 7, and 8 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for producing a dolly zoom effect, comprising:
   capturing a main image at a main location, the main image including at least a foreground object of a given size and a background;
   calculating one or more side view locations based on a zoom-in factor to be applied to the background and an estimated size of the foreground object;
   guiding a user to capture one or more side view images at the one or more side view locations;
   superimposing the foreground object of the given size onto a zoomed-in background; and
   performing image inpainting using side view information from the one or more side view images.

2. The method of claim 1, wherein calculating one or more side view locations further comprises:
   calculating a distance between the main location and a side view location based on the zoom-in factor and an estimated width of the foreground object.

3. The method of claim 2, further comprising:
   capturing a first side view image at a first side view location having the calculated distance to the right of the main location; and
   capturing a second side view image at a second side view location having the calculated distance to the left of the main location.

4. The method of claim 1, wherein the main image and the one or more side view images are captured with a same focal length.

5. The method of claim 1, further comprising:
   determining the zoom-in factor of the background based on a user input received from a user interface.

6. The method of claim 1, further comprising:
   displaying an indication of a distance between the main location and a side view location; and
   indicating that the user has reached the side view location.

7. The method of claim 1, further comprising:
   generating, using a trained neural network, a respective depth map for each of the main image and the one or more side view images; and
   identifying the foreground object and the background based on depth maps.

8. The method of claim 1, further comprising:
   obtaining a respective depth map when capturing each of the main image and the one or more side view images; and
   identifying, using a trained neural network, the foreground object and the background based on depth maps.

9. The method of claim 1, wherein performing the image inpainting further comprises:
   performing, using a trained neural network, the image inpainting to fill in background areas adjacent to the foreground object with information obtained from the one or more side view images.

10. The method of claim 1, further comprising:
    capturing a second image with a reduced focal length, the second image including the foreground object and a zoom-out background; and
    superimposing the foreground object of the given size extracted from the main image onto a zoomed-out background.

11. A system operative to produce a dolly zoom effect, comprising:
    a camera to capture a main image at a main location, the main image including at least a foreground object of a given size and a background;
    processing hardware; and
    a memory to store instructions, which when executed by the processing hardware, cause the processing hardware to:
    calculate one or more side view locations based on a zoom-in factor to be applied to the background and an estimated size of the foreground object;
    guide a user to use the camera to capture one or more side view images at the one or more side view locations;
    superimpose the foreground object of the given size onto a zoomed-in background; and
    perform image inpainting using side view information from the one or more side view images.

12. The system of claim 11, wherein the processing hardware is further operative to:
    calculate a distance between the main location and a side view location based on the zoom-in factor and an estimated width of the foreground object.

13. The system of claim 12, wherein the one or more side view images include a first side view image captured at a first side view location having the calculated distance to the right of the main location, and a second side view image captured at a second side view location having the calculated distance to the left of the main location.

14. The system of claim 11, wherein the main image and the one or more side view images are captured with a same focal length.

15. The system of claim 11, further comprising a user interface operative to receive a user input, wherein the processing hardware is further operative to:
    determine the zoom-in factor of the background based on the user input.

16. The system of claim 11, further comprising a user interface operative to display an indication of a distance between the main location and a side view location, and indicate that the user has reached the side view location.

17. The system of claim 11, further comprising:
a trained neural network stored in the memory, the trained neural network operative to generate a respective depth map for each of the main image and the one or more side view images.

18. The system of claim 11, further comprising:
a depth-sensing camera operative to capture a respective depth map together with each of the main image and the one or more side view images.

19. The system of claim 11, further comprising:
a trained neural network stored in the memory, the trained neural network operative to perform the image inpainting to fill in background areas adjacent to the foreground object using information obtained from the one or more side view images.

20. The system of claim 11, wherein the camera is further operative to:
capture a second image with a reduced focal length, the second image including the foreground object and a zoom-out background, and
wherein the processing hardware is further operative to superimpose the foreground object of the given size extracted from the main image onto a zoomed-out background.

\* \* \* \* \*